ary, Agent, or Firm—Spencer & Frank

United States Patent [19]

Hettich et al.

[11] Patent Number: 5,790,043
[45] Date of Patent: Aug. 4, 1998

[54] PROCEDURE FOR OPERATING A LOCKING SYSTEM FOR LOCKABLE OBJECTS

[75] Inventors: Gerhard Hettich, Dietenhofen; Reiner Doerfler, Heroldsberg; Peter Robitschko, Sindelfingen, all of Germany

[73] Assignees: Temic Telefunken microelectronic GmbH, Heilbronn; Mercedes-Benz Aktiengesellschaft, Stuttgart, both of Germany

[21] Appl. No.: 497,598

[22] Filed: Jun. 30, 1995

[30] Foreign Application Priority Data

Jun. 30, 1994 [DE] Germany .................. 44 22 906.2

[51] Int. Cl.⁶ .................. G08C 19/00; B60R 25/04
[52] U.S. Cl. .................. 340/825.31; 340/825.34; 340/825.69; 340/825.72; 340/825.54; 70/276; 70/277; 70/278; 307/10.1; 307/10.2
[58] Field of Search .................. 340/825.31, 825.34, 340/825.54, 825.69, 825.72; 307/10.1, 10.2, 10.3, 10.4, 10.5; 70/256, 276, 277, 278, 262, 263, 264, 266, 267

[56] References Cited

U.S. PATENT DOCUMENTS

| | | | |
|---|---|---|---|
| 3,812,403 | 5/1974 | Gartner | 317/134 |
| 4,738,334 | 4/1988 | Weishaupt | 180/287 |
| 4,881,148 | 11/1989 | Lambropoulos et al. | 361/172 |
| 4,942,393 | 7/1990 | Waraksa et al. | 340/825.72 |
| 5,442,243 | 8/1995 | Bailey | 307/10.5 |
| 5,561,420 | 10/1996 | Kleefeldt et al. | 340/825.31 |

FOREIGN PATENT DOCUMENTS

| | | |
|---|---|---|
| 0098437 | 1/1984 | European Pat. Off. . |
| 0218251 | 4/1987 | European Pat. Off. . |
| 0440974 | 8/1991 | European Pat. Off. . |
| 0502234 | 9/1992 | European Pat. Off. . |
| 92/18732 | 10/1992 | WIPO . |

OTHER PUBLICATIONS

C. Schneider et al.: "Ein Fahrzeugsicherungssystem ohne mechanischen Schluessel". In: ATZ Automobil-technische Zeitschrift, Column 96 (1994), No. 5, pp. 321-323 and 330. No month.

*Primary Examiner*—Michael Horabik
*Assistant Examiner*—Yonel Beaulieu
*Attorney, Agent, or Firm*—Spencer & Frank

[57] ABSTRACT

A process to operate a locking system for lockable objects which features a key module having a remote control unit and a transponder for transmitting and receiving coded signals, and a lock module, fitted inside or on the lockable object, comprising a receiver unit for detection of coded signals, an evaluation unit for verification of coded signals, and a control unit for actually carrying out the unlocking or locking operation on the lockable object. A bidirectional data transmission between the key module and the lock module takes place before unlocking or locking of the object. On receiving an unlocking or locking signal sent out by the key module, the lock module will go into a waiting or standby mode and itself send out control signals by use of a transmission unit. When the user approaches the lockable object, one of the control signals will be received and evaluated by the transponder of the key module. The transponder will then transmit a control signal to the lock module activating the control unit to carry out the requested unlocking or locking operation if the proper control signal is received.

14 Claims, 2 Drawing Sheets

_____

PROCEDURE FOR OPERATING A LOCKING SYSTEM FOR LOCKABLE OBJECTS

DESCRIPTION OF THE PRIOR ART

For most lockable objects, access authorization (the locking/unlocking operation) will be effected by mechanical means—thus, for instance, unlocking/locking of the driver's door (vehicle doors) in motor vehicles and starting the motor vehicle will normally be effected by means of a vehicle key. In addition, locking systems have recently come into use where the unlocking/locking operation is effected by electronic means, using data transmission processes. This type of locking system comprises, for example, a key module complete with a battery-operated (HF or IR) remote control which will initiate locking/unlocking of the lockable object by transmitting a coded signal, and a lock module fitted either on or inside the lockable object for detection and checking the coded signal transmitted by the key module and for carrying out the unlocking/locking operation. The disadvantage here is that due to accidental operation of the long range remote control of the key module, the unlocking/locking operation is frequently set in motion quite unintentionally.

SUMMARY OF THE INVENTION

It is the object of the present invention to provide a simple procedure for operating a locking system where any unintentional unlocking/locking operations are largely prevented from occurring.

The above object generally is achieved according to the present invention by a process of operating a locking system for a lockable object which system has a key module comprising a remote control and a transponder for transmitting and receiving coded signals, and a lock module, which is fitted inside or on the lockable object, and which comprises a receiver unit for detection of coded signals, an evaluation unit for verification of coded signals, and a control unit for actually carrying out the unlocking or locking operation on the lockable object, with the process including carrying out a bidirectional data transmission between the key module and the lock module before actual unlocking or locking of the object take place, with the bidirectional data transmission between the key module and the lock module comprising: transmitting a coded unlocking or locking signal from the key module to the lock module causing the lock module, after verification of the received signal, to go into a waiting or standby mode and itself send out control signals by means of a transmission unit, receiving and evaluating at least one of the control signals by the transponder of the key module when the user approaches the lockable object, and transmitting a control signal from the transponder to the lock module to activate the control unit to unlock or lock the lockable object according to the initially received coded unlocking or locking signal if the evaluated received control signal is verified.

Further advantageous applications of this invention result from the description below and various sub-claims.

According to this invention, the request for access authorization (intention to unlock/intention to lock) signalled by the user by operating the long range remote control will be checked by means of bidirectional data transmission between key module and lock module; the unlocking/locking operation will be activated only, after the user has approached the lockable object. Thus, when receiving an unlocking/locking signal the lock module will initially be set into a waiting or standby mode and transmit on its part (for instance, at certain time intervals and during a definable time period) control signals which, as the user approaches, will be received and answered by the key module transponder. Only after a valid (verifiable) answer from the transponder has been received will the control unit of the lock module be activated by this control signal to implement this unlocking/locking operation. As the transponder signal has a short range only, it will thus be possible to signal the intention to unlock/intention to lock by means of the long range remote control unit. However, the unlocking/locking operation itself will only become possible when the user has approached the lockable object until he/she is at a suitable distance from it; in particular, an unlocking/locking operation will not be carried out if the transponder (for instance, within a predefined period of time) does not receive a valid control signal. Advantageously, the user only needs to operate the key module to signal his unlocking/locking intention (for instance, by taking this module into his/her hands)-this can be done when still at a great distance from the lockable object—but not in order to activate the unlocking/locking operation. As this will be effected automatically—if the transmitted signals were verified as valid—as soon as the approaching user has reached a certain distance from the object, any unintentional unlocking/locking operation due to accidental operation of the remote control unit can be largely prevented and thus the operational safety of the system be increased. If necessary, the current locking status of the object may be indicated to the user via an optical or acoustic display.

BRIEF DESCRIPTION OF THE DRAWINGS

Using the drawings, an implementation example will be explained.

DESCRIPTION OF A PREFERRED EMBODIMENT

Figure 2:
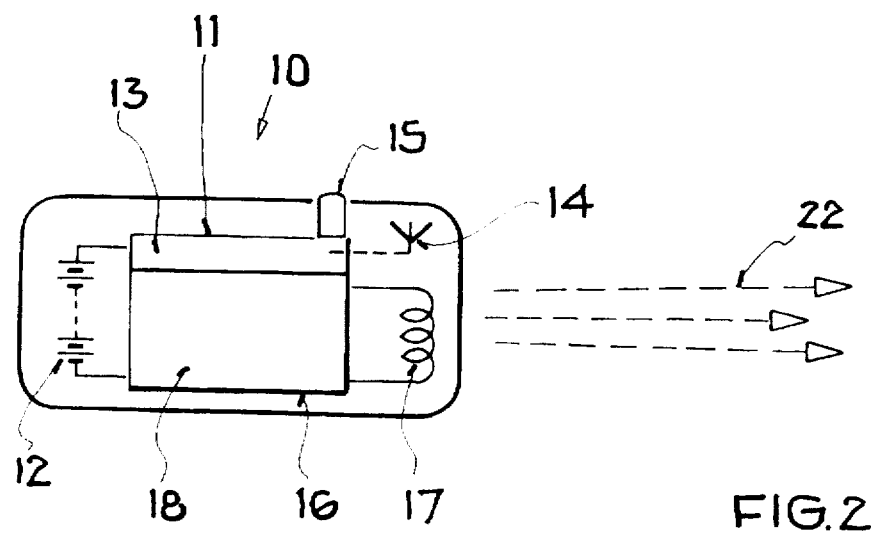
FIG. 2 shows the locking module for that locking system of FIG. 1.

According to FIG. 2, key module 10 comprises an HF remote control 11 (large range, approx. 10 m)—which can be activated by pushbutton 15 and which is powered by battery 12—, complete with an HF aerial 14 driven by electronic unit 13, as well as a transponder 16 (short range, a few cm only) complete with induction coil 17 and electronic unit 18; the electronic units 13 and 18 of remote control 11 and transponder 16 can be implemented as separate units or, alternatively, as one integrated unit. The key module 10 can be designed as a relatively small and compact component and may for instance have the dimensions 25 mm×35 mm.

Figure 1:
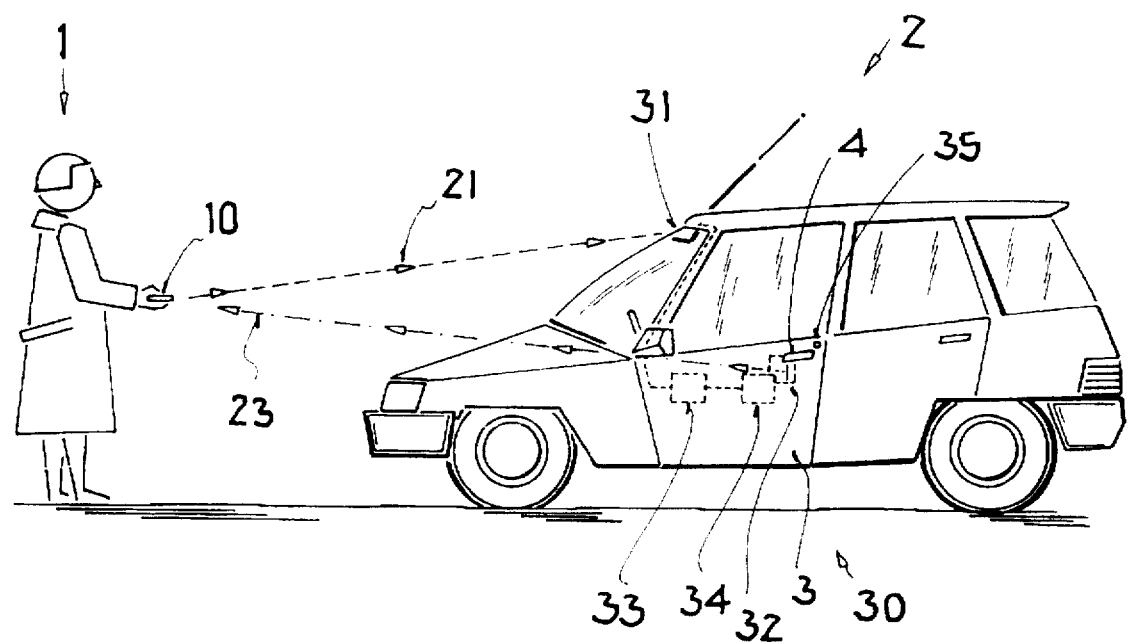
FIG. 1 shows a diagram of the locking system components for a motor vehicle according to the invention.
Figure 3:
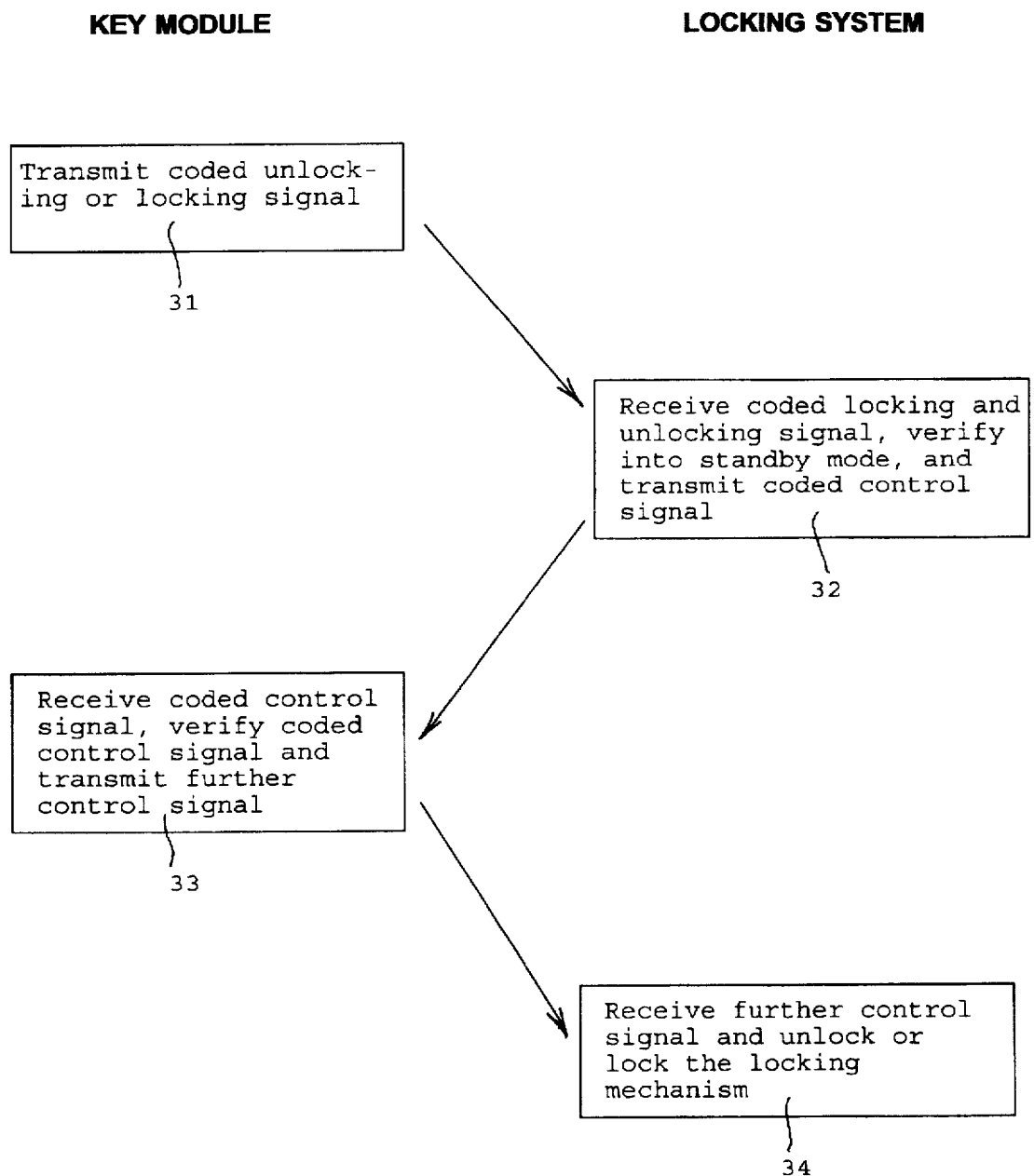
FIG. 3 is a flow chart illustrating the method according to the invention.

According to FIG. 1, user 1 will obtain access to motor vehicle 2 by means of unlocking or locking vehicle door 3 of motor vehicle 2; this can be requested by operating the long range HF remote control 11 of key module 10 (pressing pushbutton 15) at a relatively large distance from motor vehicle 2 (see FIG. 3, block 31). The coded HF signal 21, which is then sent out, will be transmitted to a receiver unit 31 of lock module 30, which receiver unit is mounted in the vehicle interior (for example, on the vehicle ceiling). Lock module 30 also comprises a transmission unit 32, an evaluation unit 33, and a control unit 34. The evaluation unit 33 may, for example, be an integral component of control unit 34, or an integral component of receiver unit 31. The evaluation unit 33 will verify the incoming HF signal 21, and if the code is duly transmitted, lock module 30 will be set into a waiting or standby mode and transmits on its part via a transmission unit 32 (located, for example, near door handle 4 of, driver's door 3) control signals 23 at intervals of e.g., 0.3 s with a frequency of, e.g., 125 kHz (see FIG. 3, block 32. These control signals 23 will be received by induction coil 17 of transponder 16 in key module 10, if user 1 comes sufficiently close to motor vehicle 2 (thus, for instance, the maximum range may be 70 cm), and evaluated by electronic unit 18 of transponder 16. If a control signal 23 has been correctly received (see FIG. 3, block 33), key module 10 will transmit—via induction coil 17 of transponder 16-a control signal 22 to lock module 30, and this will activate control unit 34 which will effect an unlocking/ locking of driver's door 3 (see FIG. 3, block 34). Furthermore, an optical display device 35 will be provided near door handle 4 of driver's door 3, which display device will be used to indicate locking status of motor vehicle 2 (it is also conceivable to indicate this locking status by means of an acoustic bleeping signal on the dashboard of motor vehicle 2).

What is claimed is:

1. Process to operate a locking system for a lockable object which system has a key module comprising a remote control and a transponder for transmitting and receiving coded signals, and a lock module, fitted inside or on the lockable object, comprising a receiver unit for detection of coded signals, an evaluation unit for verification of coded signals, and a control unit for actually carrying out the unlocking or locking operation on the lockable object, wherein, before unlocking or locking the object, a bidirectional data transmission between the key module and the lock module takes place, in that on receiving an unlocking or locking coded signal transmitted by the key module, the lock module goes into a waiting or standby mode and itself sends out coded control signals by means of a transmission unit, when the user approaches the lockable object, one of the coded control signals is received and evaluated by the transponder of the key module, and the transponder transmits a further control signal to the lock module activating the control unit to unlock or lock the lockable object if the coded control signal received by the transponder is verified.

2. Process according to claim 1 wherein the control signals are transmitted by the transmission unit of the lock module at certain time intervals.

3. Process according to claim 1 wherein the control signals of the lock module transmission unit are transmitted within a predefinable time period.

4. Process according to claim 1 wherein the control signals are in the HF range and are transmitted by a transmission unit designed as a coil.

5. Process according to claim 1 wherein the locking status of the lockable object is indicated either optically or acoustically by a display device.

6. Process according to claim 1 wherein coded signals are transmitted by the transmission unit either via a remote control unit using an HF aerial activated by a pushbutton or via a transponder using an induction coil.

7. Process according to claim 6 wherein the coded signals transmitted by the remote control unit are sent out in the HF range.

8. Process according to claim 1 wherein access authorization for at least one door of a motor vehicle is obtained.

9. A process for operating a locking system for a lockable object which system includes a key module having a remote control unit and a transponder for transmitting and receiving respective coded signals, and a lock module, which is mounted inside or on the lockable object, and which has a receiver unit for detection of coded signals, an evaluation unit for verification of received coded signals, a transmission unit for transmitting coded signals, and a control unit for actually carrying out the unlocking or locking operation on the lockable object, said process comprising the steps of:

prior to unlocking or locking the object, carrying on a bidirectional data transmission between the key module and the lock module including the following steps, in sequence causing the key module to transmit a coded unlocking or locking signal;

receiving the coded unlocking or locking signal transmitted by the key module in the lock module and verifying the received signal in the lock module;

following verification of the received signal, causing the lock module to go into a standby mode and transmit coded control signals;

receiving at least one of the transmitted control signals by the transponder of the key module when the user approaches the lockable object;

verifying the received coded control signal in the transponder of the key module; and, following verification of the received coded control signal, transmitting a further control signal from the transponder to the lock module to activate the control unit to actually unlock or lock the lockable object.

10. The process according to claim 9 wherein the coded control signals transmitted by the lock module are transmitted at certain time intervals.

11. The process according to claim 9 wherein the coded control signals transmitted by the lock module are transmitted within a predefinable time period.

12. The process according to claim 9 wherein the coded unlocking or locking signal are transmitted in the HF range and the subsequent coded control and further control signals are transmitted at a lower frequency and with a shorter range.

13. The process according to claim 9 further comprising indicating the locking status of the lockable object, either optically or acoustically, by a display device on the lockable object.

14. The process according to claim 9 wherein the lockable object is a motor vehicle, and wherein activation of the control unit unlocks or locks at least one door of the motor vehicle.

* * * * *